(12) United States Patent
Hall

(10) Patent No.: US 11,434,686 B2
(45) Date of Patent: Sep. 6, 2022

(54) PRESSURE MONITOR

(71) Applicant: KINGSWAY ENTERPRISES (UK) LIMITED, Swanley (GB)

(72) Inventor: Benjamin Hall, Swanley (GB)

(73) Assignee: Kingsway Enterprises (UK) Limited, Kent (GB)

(*) Notice: Subject to any disclaimer, the term of this patent is extended or adjusted under 35 U.S.C. 154(b) by 141 days.

(21) Appl. No.: 16/992,396

(22) Filed: Aug. 13, 2020

(65) Prior Publication Data

US 2021/0148162 A1 May 20, 2021

(30) Foreign Application Priority Data

Nov. 20, 2019 (GB) ...................................... 1916899

(51) Int. Cl.
*E06B 5/10* (2006.01)
*G01L 1/00* (2006.01)
*G08B 21/02* (2006.01)

(52) U.S. Cl.
CPC ................ *E06B 5/10* (2013.01); *G01L 1/005* (2013.01); *G08B 21/02* (2013.01)

(58) Field of Classification Search
CPC ....................................................... E06B 5/10
See application file for complete search history.

(56) References Cited

U.S. PATENT DOCUMENTS

| | | |
|---|---|---|
| 3,868,000 A | 2/1975 | Spear et al. |
| 4,115,952 A | 9/1978 | French |
| D268,809 S | 5/1983 | Marontate |
| 4,675,659 A | 6/1987 | Jenkins, Jr. et al. |
| 4,920,241 A | 4/1990 | Miller |
| D309,869 S | 8/1990 | Dunmore |
| 5,027,552 A | 7/1991 | Miller et al. |
| D322,634 S | 12/1991 | Callas |
| D323,788 S | 2/1992 | Roberts et al. |
| D325,355 S | 4/1992 | Meguerdichian et al. |
| 5,240,349 A * | 8/1993 | Kennedy .................. E21F 1/10 49/118 |
| D425,810 S | 5/2000 | Siller et al. |

(Continued)

FOREIGN PATENT DOCUMENTS

| | | |
|---|---|---|
| AT | 414005 B | 8/2006 |
| CA | 2572810 C | 1/2005 |

(Continued)

OTHER PUBLICATIONS

"Instastop Door Top Alarm" available Aug. 22, 2019, [online], [site visited Aug. 22, 2019] Retrieved from Internet, URL:https://anti-ligature-shop.co.uk/product/intastop-door-top-alarm/ (Year: 2019).

(Continued)

*Primary Examiner* — Travis R Hunnings
(74) *Attorney, Agent, or Firm* — Erise IP, P.A.

(57) ABSTRACT

Provided herein is a pressure monitor for attachment at an edge of a door leaf, the pressure monitor configured, in response to a force applied to the pressure monitor in a first direction perpendicular to the plane of the door leaf, and in response to a force applied to the pressure monitor in a second direction that is parallel to the plane of the door leaf or opposite to the first direction, to issue a signal indicating that a force has been applied.

20 Claims, 4 Drawing Sheets

(56) References Cited

U.S. PATENT DOCUMENTS

| | | | |
|---|---|---|---|
| 6,080,981 | A | 6/2000 | Payne |
| D449,244 | S | 10/2001 | Ginzel |
| 6,544,200 | B1 | 4/2003 | Smith et al. |
| 6,689,970 | B2 | 2/2004 | Burgess et al. |
| 6,720,874 | B2 | 4/2004 | Fufido et al. |
| D496,577 | S | 9/2004 | Cohrs, Jr. et al. |
| 6,984,818 | B1 | 1/2006 | Breed et al. |
| 7,024,823 | B2 | 4/2006 | Keller |
| 7,116,072 | B1 | 10/2006 | Murray et al. |
| 7,118,141 | B2 | 10/2006 | Cohrs, Jr. et al. |
| 7,132,642 | B2 | 11/2006 | Shank et al. |
| 7,373,694 | B1 | 5/2008 | Kopp |
| 7,603,813 | B2 | 10/2009 | Hackl |
| 7,999,690 | B1 * | 8/2011 | Shilts .................... G08B 21/22 340/666 |
| RE42,991 | E | 12/2011 | Cook |
| RE44,039 | E | 3/2013 | Cook |
| 8,646,206 | B2 | 2/2014 | Gilchrist |
| D743,290 | S | 11/2015 | Welch et al. |
| 2004/0030531 | A1 | 2/2004 | Miller et al. |
| 2006/0192396 | A1 | 8/2006 | Frovlov et al. |
| 2010/0102978 | A1 * | 4/2010 | Wittke .................. E05B 45/086 340/665 |
| 2010/0194563 | A1 | 8/2010 | Berner et al. |
| 2010/0325967 | A1 | 12/2010 | Pearson et al. |
| 2010/0325980 | A1 | 12/2010 | Gilchrist |
| 2011/0068927 | A1 | 3/2011 | Berger |
| 2019/0266862 | A1 | 8/2019 | Harrison et al. |
| 2020/0208459 | A1 * | 7/2020 | Trobro .................. E05F 15/603 |
| 2021/0189767 | A1 * | 6/2021 | Hall ...................... G08B 21/182 |
| 2021/0225142 | A1 * | 7/2021 | Izod ....................... G08B 21/02 |

FOREIGN PATENT DOCUMENTS

| | | | |
|---|---|---|---|
| CN | 1346327 | A | 4/2002 |
| CN | 203961709 | U | 11/2014 |
| CN | 205604875 | U | 9/2016 |
| CN | 107890217 | A | 4/2018 |
| CN | 207651827 | U | 7/2018 |
| CN | 108388296 | A | 8/2018 |
| CN | 207813257 | U | 9/2018 |
| CN | 208030656 | U | 11/2018 |
| CN | 209444091 | U | 9/2019 |
| DE | 3007170 | A1 | 9/1981 |
| DE | 3706624 | A1 | 9/1987 |
| DE | 19638359 | A1 | 4/1998 |
| DE | 202005012636 | U1 | 12/2006 |
| EP | 1051695 | A1 | 11/2000 |
| FI | 116408 | B | 11/2005 |
| FR | 2759804 | B1 | 8/1998 |
| FR | 3066218 | A1 | 11/2018 |
| GB | 2276659 | A | 10/1994 |
| GB | 2435992 | A | 9/2007 |
| GB | 2435993 | A | 9/2007 |
| GB | 2435994 | A | 9/2007 |
| GB | 4030455 | A | 6/2013 |
| GB | 2564733 | A | 1/2019 |
| JP | H1076843 | A | 3/1998 |
| JP | 2000009554 | A | 1/2000 |
| JP | 20000057881 | A | 2/2000 |
| JP | 3271917 | B2 | 4/2002 |
| JP | 2004162401 | A | 6/2004 |
| JP | 2005120653 | A | 5/2005 |
| JP | 2006266018 | A | 10/2006 |
| JP | 2006274590 | A | 10/2006 |
| JP | 2007154561 | A | 6/2007 |
| JP | 4263978 | B2 | 5/2009 |
| JP | 4435534 | B2 | 3/2010 |
| WO | 2019220089 | A1 | 11/2019 |

OTHER PUBLICATIONS

"Kingsway KG500 Anti Ligature door top monitor". available Aug. 22, 2019, [online], [site visited Aug. 22, 2019]. Retrieved from Internet, URL:https://anti-ligature-shop.co.uk/product/kingsway-kg500-anti-ligature- -door-top-monitor/ (Year: 2019).

"Piedmont Door Solutions" available Aug. 22, 2019, [online], [site visited Aug. 22, 2019]. Retrieved from Internet, URL:http://www.piedmontdoorsolutions.com/products/anti-ligature-solutions- / (Year: 2019).

Yeager, et al., "Measured Response to Identified Suicide Risk and Violence: What You Need to Know About Psychiatric Patient Safety," Oxford University Press, 2005.

Baumer, Inductive Proximity Switch, IFFM 08P17A6/L, Dec. 18, 2016.

Keller, "Inpatient Suicide Prevention," Joint Commission Journal on Quality and Patient Safety/ Joint Commission Resources, Jul. 2008.

Great Britain Patent Application 191884.6 Combined Search and Examination Report dated Jun. 3, 2020.

Canada Patent Application 3089507 Examination Search Report dated Nov. 30, 2021.

Great Britain Patent Application GB1918884.6 Search Report dated Jan. 13, 2021.

Great Britain Combined Search and Examination Report for GB2109187.1 dated Sep. 3, 2021.

Great Britain Patent Application 2110845.1 Combined Search and Examination Report dated Aug. 24, 2021.

Great Britain Patent Application GB1916899.6 Combined Search and Examination Report dated May 19, 2020.

* cited by examiner

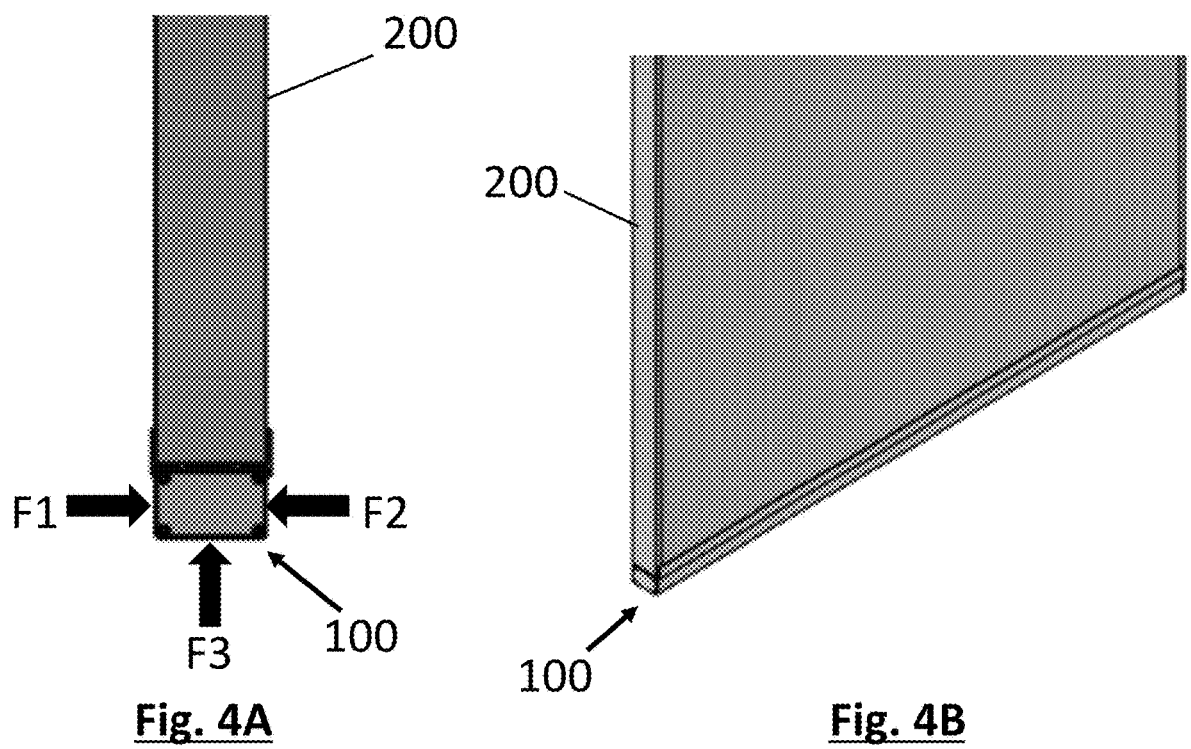
Fig. 4A
Fig. 4B
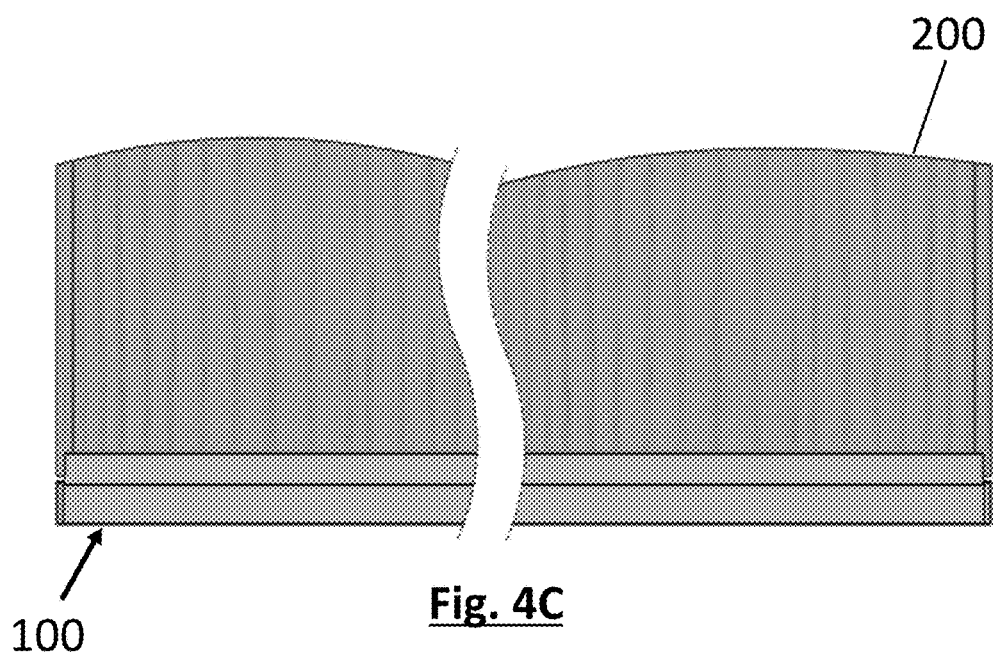
Fig. 4C

PRESSURE MONITOR

RELATED APPLICATIONS

This application claims priority to Great Britain Patent Application No. 1916899.6, filed Nov. 20, 2019, the disclosure of which is incorporated herein by reference in its entirety.

FIELD

The present disclosure relates to a pressure monitor for a door leaf, and in particular to a pressure monitor capable of reliably detecting a ligature looped around an edge of a door.

BACKGROUND

In psychiatric hospitals and prisons, a problem exists that patients and inmates may wish to cause themselves harm using a ligature created by securing a rope or cable around an available anchor point in a room. One solution to this problem is to design room fixtures and fittings such that they do not provide such anchor points. However, in some cases this is difficult or impossible. An example of this is door fittings. Individuals may try to create a ligature by securing a rope or cable around a top edge of a door frame.

U.S. patent application Ser. No. 12/915,218 describes a door alarm system which activates when a door is closed with something over the top of the door. Such a door alarm system can detect a sheet, cord or the like over the top of a door. However, the pressure monitor disclosed therein can be unreliable. There exists a need for improved means of detecting the presence of a ligature looped around an edge of a door.

SUMMARY

The inventor of the subject matter described in the present disclosure has found a door alarm system such as that described in U.S. patent application Ser. No. 12/915,218 detects forces applied to a door leaf in a substantially vertical (downwards) direction. It may therefore be possible to circumvent such existing door alarm systems by looping a cable or rope around the top edge of a door leaf to which the door alarm system is fitted, and applying a tension to the rope or cable in a horizontal direction. The existing door alarm system would seem not to activate when a force is applied in the horizontal direction. It may therefore be possible for patients and inmates to circumvent existing door alarm systems, such as that described in U.S. Ser. No. 12/915,218, and cause themselves harm.

At its most general, the present disclosure provides a pressure monitor that is configured to enable reliable detection of forces applied to an edge of a door leaf, in particular forces applied to a bottom edge of a door leaf.

In a first aspect of the present disclosure there is provided a pressure monitor for attachment at an edge of a door leaf, the pressure monitor configured, in response to a force applied to the pressure monitor in a first direction perpendicular to the plane of the door leaf, and in response to a force applied to the pressure monitor in a second direction that is parallel to the plane of the door leaf or opposite to the first direction, to issue a signal indicating that a force has been applied.

The present inventor has also found that it is possible to create a ligature by passing a rope or cable around a bottom edge of a door leaf, rather than a top edge of a door leaf. When a ligature is created by passing a cable or rope around a bottom edge of a door leaf, the inventor has found it to be likely that the rope or cable will apply a force to the bottom edge of the door leaf in a horizontal direction (rather than a vertical direction). The first aspect addresses this.

Specifically, forces applied to an edge of a door leaf are reliably detected by the pressure monitor of the first aspect, regardless of whether they are applied in the first direction or in the second direction. The pressure monitor of the first aspect is sufficiently versatile to reliably detect forces applied by a ligature secured to the bottom edge of a door leaf.

Where the second direction is parallel to the plane of the door leaf (i.e. perpendicular to the first direction), the pressure sensor (when attached to a top or bottom edge of a door leaf) is capable of issuing a signal in response to forces applied to the door leaf in both the vertical direction and in the horizontal direction.

Where the second direction is opposite to the first direction, the pressure sensor (when attached to a top or bottom edge of a door leaf) is capable of issuing a signal in response to forces applied to the door leaf in both the 'closing' direction and the 'opening' direction of the door leaf when attached to a door frame.

The pressure monitor may further be configured to detect forces applied to the pressure monitor in a third direction. In this case, the second direction is opposite to the first direction (i.e. is horizontal and is opposite to the first direction), and the third direction is parallel to the plane of the door leaf (i.e. is perpendicular to the first and second directions). In particular, where the pressure sensor is attached to the top or bottom edge of a door leaf which itself is attached to a door frame, the pressure monitor is capable of detecting forces applied in the vertical direction, and in the 'opening' and 'closing' horizontal directions of the door. This arrangement makes the pressure monitor particularly reliable and versatile, because no matter in what direction a force is applied to the edge of the door leaf, it will always have a component in at least one of the three directions.

The pressure monitor may comprise a first pressure sensor arranged to detect forces applied in the first direction; and a second pressure sensor arranged to detect forces applied in the second direction. In examples in which the pressure monitor is also configured to detect forces applied to the pressure monitor in the third direction, the pressure monitor may further comprise a third pressure sensor arranged to detect forces applied in the third direction. Each pressure sensor may comprise an electrical pressure sensor. For example, each pressure sensor may comprise a pressure switch, such as a ribbon switch. Alternatively, each pressure sensor may comprise a resistive pressure sensor, or a piezoelectric pressure sensor.

The pressure monitor may be configured for attachment along at least a portion of an edge of a door leaf, and may comprise a first pressure sensor arranged along a longitudinal axis of the pressure monitor to detect forces applied in the first direction; and a second pressure sensor arranged along the longitudinal axis of the pressure monitor to detect forces applied in the second direction. In examples in which the pressure monitor is also configured to detect forces applied to the pressure monitor in the third direction, the pressure monitor may further comprise a third pressure sensor arranged along a longitudinal axis of the pressure monitor to detect forces applied in the third direction. Accordingly, forces applied in any direction and at any point along the portion of the edge of the door leaf are detectable. Each direction may be perpendicular to the longitudinal axis.

The pressure monitor may comprise a spine, the spine comprising a plate portion for attachment to the at least a portion of an edge of a door leaf; and a box portion arranged alongside the plate portion, wherein each pressure sensor is attached to a respective wall of the box portion. Each pressure sensor may be attached along a respective wall of the box portion.

The plate portion may comprise upturned edges for locating the plate portion at the edge of the door leaf. The upturned edges may be configured to engage opposing sides of the door leaf.

The box portion may comprise first and second walls oriented substantially perpendicular to the plate portion, and a third wall oriented substantially parallel with the plate portion. The first, second and third pressure sensors may be respectively attached to the first, second and third walls of the box portion. Each of the first, second and third pressure sensors may be secured within a respective channel extending along the respective wall of the box portion.

The pressure monitor may further comprise a housing which houses the box portion such that each pressure sensor bears against a respective inner surface of the housing, wherein the housing is moveable relative to the box portion in each of the directions. The housing may have a generally U-shaped cross-section. For example, the housing may comprise a first inner surface that is generally parallel with the first wall of the box portion; a second inner surface that is generally parallel with the second wall of the box portion; and a third inner surface that is generally parallel with the third wall of the box portion.

The first, second and third pressure sensors may respectively bear against the first, second and third inner surfaces of the housing. Accordingly, when a force is applied to a first outer surface of the housing, the first pressure sensor (which is 'sandwiched' between the first inner surface of the housing and the first wall of the box portion) will be compressed and thus experience an increase in pressure.

Each of the first, second and third inner surfaces of the housing may comprise a groove. Each pressure sensor may bear against the groove in the respective inner surface of the housing. For example, each pressure sensor may comprise a protrusion that bears against the respective groove.

The housing may comprise a lip which projects inwards from an inner surface of the box portion (for example projects inwards from one of the first inner surface and the second inner surface), wherein the lip engages a recess in the spine between the plate portion and the box portion. Separation of the housing from the spine is thereby prevented. In some examples, the housing may comprise a first lip which projects inwards from the first inner surface, and a second lip which projects inwards from the second inner surface. Each lip may engage a respective recess in the spine between the plate portion and the box portion to thereby prevent separation of the housing from the spine.

The spine may further comprise retaining surfaces which project from the plate and extend along outer side surfaces of the housing adjacent the first and second lips.

Each of the spine and the housing may be formed by extrusion. Further, they may each be formed of metal, for example aluminium.

The pressure monitor may be configured to issue an alert signal when a force is applied to the pressure monitor in one or more of the directions. In particular, the pressure monitor may comprise an alert system connected to each of the pressure sensors; the alert system configured, upon a force exceeding a predetermined threshold being applied to one or more of the pressure sensors, to issue an alert signal. The predetermined threshold may be at least 50N. In some examples, the predetermined threshold may be at least 60N. In yet further examples, the predetermined threshold may be at least 65N.

Where each of the pressure sensors is an electrical pressure switch, the alert system may be configured, upon one or more of the pressure switches being closed by a force applied thereto, to issue the alert signal.

Alternatively, where each of the pressure sensors is a resistive or a piezoelectric pressure sensor, the alert system may be configured, upon a change in an electrical property of one or more of the pressure sensors exceeding a predetermined threshold, to issue the alert signal. The alert signal may be issued when a change in an electrical property of one or more of the pressure sensors exceeds a predetermined threshold. Where the pressure sensors are resistive pressure sensors, the electrical property is resistance. Where the pressure sensors are electrical pressure sensors, the electrical property is EMF.

The alert signal may comprise an electrical signal for transmission to a remote location. The transmission may be a wireless transmission. Thus, the alert system may comprise a wireless transmitter for wirelessly transmitting alert signals (e.g. to a central control system). Alternatively, the alert signal may comprise an audible signal, or a visual signal. Accordingly, the alert system may comprise a buzzer, a speaker, a LED, or a display screen. These are non-exhaustive examples.

The box portion may be hollow, and may house the alert system.

In a second aspect there is provided a door leaf having a pressure monitor according to the first aspect attached at an edge thereof. In some examples the pressure monitor is attached at a bottom edge of the door leaf. The pressure monitor may extend the entire length of the edge of the door leaf to which it is attached. Where the pressure monitor comprises upturned edges for locating the plate portion at the edge of the door leaf, the upturned edges may abut opposing sides of the door leaf.

In a third aspect there is provided a door comprising a door frame, and a door leaf according to the second aspect pivotally attached to the door frame. The first and second directions may be horizontal; and the third direction may be vertical. The pressure monitor may be attached to the bottom edge of the door leaf, and the third direction may be upwards.

BRIEF DESCRIPTION OF THE DRAWINGS

Examples of the present disclosure will now be described, by way of example only, with reference to the accompanying figures, in which:

FIGS. 4A-4C show a door leaf with the pressure monitor of FIG. 1 fitted to a bottom edge thereof.

DETAILED DESCRIPTION

Figure 1:
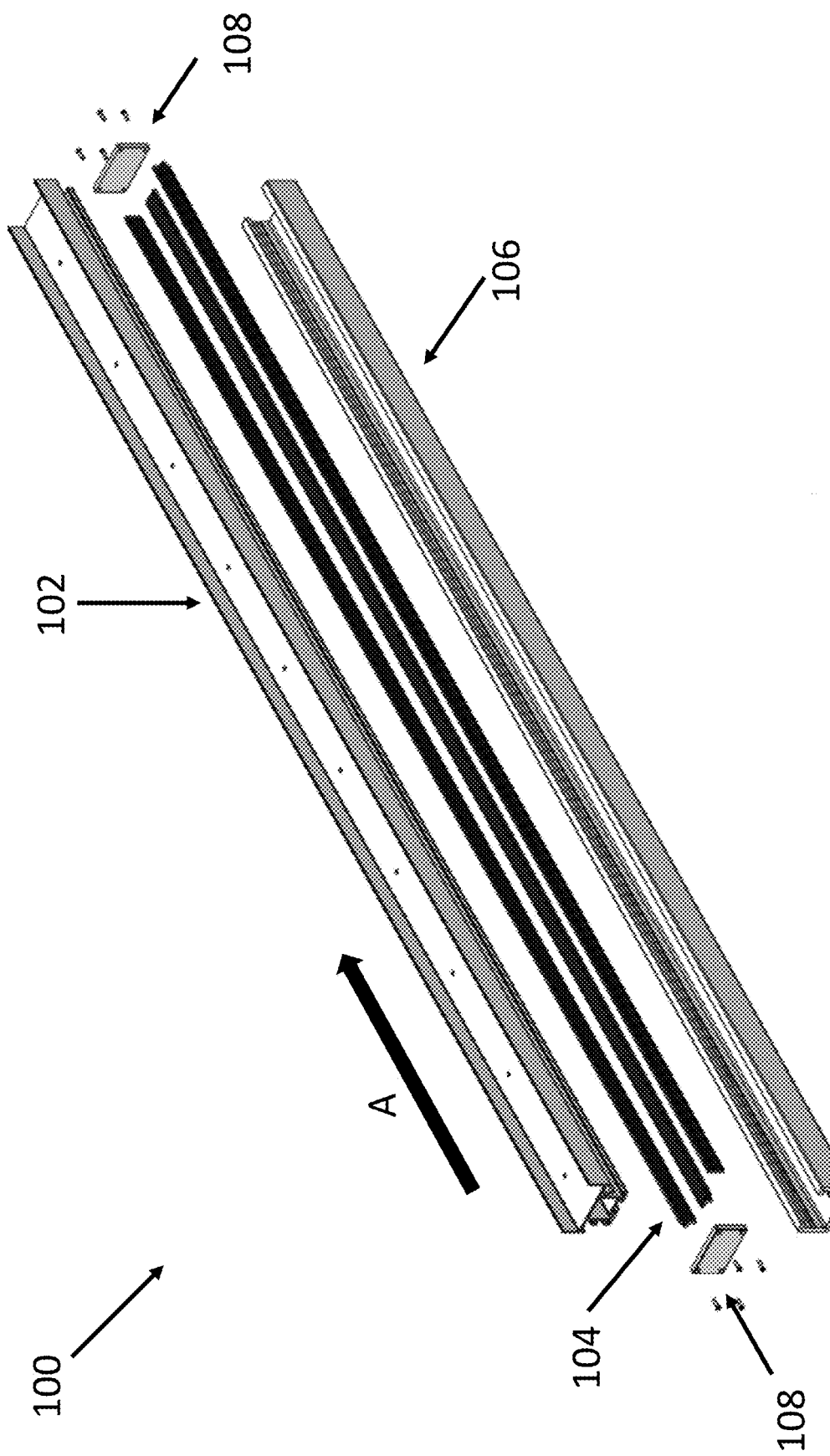
FIG. 1 shows an exploded view of a pressure monitor for attachment to an edge of a door leaf.

FIG. 1 shows an exploded view of a pressure monitor 100 for attachment to an edge of a door leaf (not shown in FIG.

Figure 2:
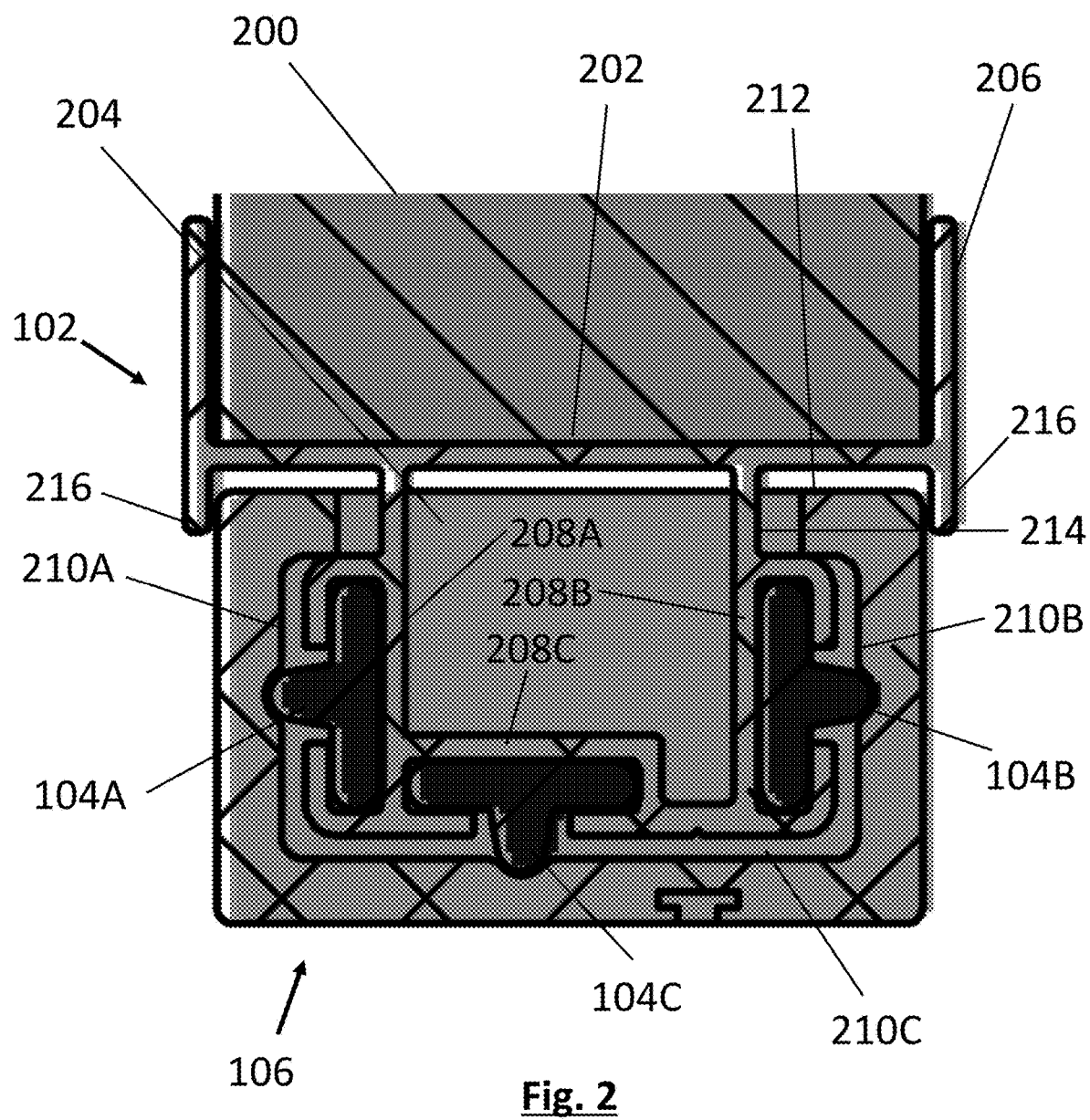
FIG. 2 shows an end-view of the pressure monitor of FIG. 1.

1). The pressure monitor 100 has an elongate spine 102 for attachment to an edge of a door leaf; elongate ribbon switches 104; and an elongate housing 106. End-plates 108 and housing 106 conceal the ribbon switches 104 when the pressure monitor 100 is assembled, as illustrated in FIG. 2. With continued reference to FIG. 1, the pressure monitor 100 has a longitudinal axis A that extends along the length of the pressure monitor 100. The length corresponds to the length of the bottom edge of the door leaf. Where elongate components are referred to herein, it is to be understood that those components extend in the longitudinal direction A.

FIG. 2 shows an end-view of the pressure monitor 100 of FIG. 1 when assembled, with the end-plates 108 removed to reveal the inner layout of the pressure monitor 100. Pressure monitor 100 is shown attached to a door leaf 200 in FIG. 2.

The spine 102 has an elongate plate portion 202, and an elongate hollow box portion 204 which is arranged parallel to the plate portion 202. Spine 102 has a uniform cross-section as viewed along the longitudinal axis, and as such is manufactured by extrusion. The spine 102 is thus of unitary construction—such that the components of the spine form a single unitary piece. The spine is aluminum.

As shown, plate portion 202 abuts the edge of the door leaf 200, while elongate upturned edges 206 abut opposing sides of the door leaf 200, adjacent to the edge in abutment with the plate portion 202. The upturned edges 206 help to locate the pressure monitor 100 at the edge of the door leaf. They also ensure a substantially flush interface between the door leaf 200 and the pressure monitor 100. This ensures that no anchor points for a ligature exist between the door leaf 200 and the pressure monitor 100.

Screws (not shown) extend through the plate portion 202 and into the edge of the door leaf 200, thus securing the pressure monitor 100 to the door 200. In alternative embodiments, screws (not shown) may extend through the upturned edges 206 and into the sides door leaf 200.

The box portion 204 has a first elongate wall 208A, a second elongate wall 208B and a third elongate wall 208C. The walls collectively form the box portion 204. First wall 208A and second wall 208B are substantially perpendicular with the plate portion 202. Third wall 208C is substantially parallel with the plate portion 202. First ribbon switch 104A is secured within a first elongate channel that extends along the first wall 208A. Second ribbon switch 104B is secured within a second elongate channel that extends along the second wall 208B. Third ribbon switch 104C is secured within a third elongate channel that extends along the third wall 208C. Accordingly, when a force is exerted against the first wall 208A, it is detected by the first ribbon switch 104A. The same is true of the second ribbon switch 104B, and of the third ribbon switch 104C.

As shown, the ribbon switches have a T-shaped cross-section. In particular, they have a protrusion that extends in the longitudinal direction and which protrudes from the elongate channel. Operation of the ribbon switches is described in further detail in FIG. 3 below.

With continued reference to FIG. 2, the housing 106 has a generally U-shaped cross-section as viewed along the longitudinal axis. The cross-section of the housing is uniform along the entire longitudinal length of the pressure monitor. As such, the housing 106 is manufactured by extrusion. The housing 106 is thus of unitary construction. It is made of aluminum.

As shown in FIG. 2, housing 106 is coupled to the spine 102 so as to house the box portion 204 and the ribbon switches 104A-C. First ribbon switch 104A engages and bears against a first elongate groove formed in first inner surface 210A of the housing 106. Second ribbon switch 104B engages and bears against a second elongate groove formed in second inner surface 210B of the housing 106. Third ribbon switch 104C engages and bears against a third elongate groove formed in the third inner surface 210C of the housing 106.

Housing 106 further includes an elongate opening, opposite the third inner surface 210C, through which the box portion 204 extends into the housing 106. Opening 212 extends from one longitudinal end of the housing 106 to the other. At the lateral edges of the opening are inward-facing elongate lips 212. Lips 212 engage (are received by) respective recesses 214 between the box portion 204 and the plate portion 202. Accordingly, separation of the housing 106 from the spine 102 is prevented. Elongate retaining surfaces 216, which are part of the spine 102, also extend along outer side surfaces of the housing 106 adjacent the lips 212. The retaining surfaces 216 limit (but do not completely prevent) lateral movement of the housing 106 relative to the spine 104 (where 'lateral' herein means a direction that is perpendicular to the longitudinal direction), thereby further preventing separation of the housing 106 from the spine 102.

As mentioned above, FIG. 2 shows the pressure monitor without the end-plate 108 from FIG. 1 fitted. As will be appreciated, because of the uniform cross-sections of the spine 102 and housing 106, there is nothing to prevent the housing 106 from sliding along the spine 102 in the longitudinal direction. To prevent this from happening, an end-plate 108 is attached to each longitudinal end of the pressure monitor. Each end-plate is screwed into a longitudinal end of the housing, to conceal the box portion and the ribbon switches therein. FIGS. 4A-4B respectively show an end-view, and a perspective view, of a door leaf 200 and pressure monitor 100, with end-plates 108 fitted to the pressure monitor 100. FIG. 4C shows a side-view of the door leaf 200 with pressure monitor 100 fitted.

<Dimensions>

As the skilled person will appreciate, the pressure monitor can have a variety of dimensions, dependent on the size of the door leaf to which it is to be fitted. Nonetheless, dimensions of an example pressure monitor will now be provided for illustrative purposes.

The pressure monitor of FIG. 1 has a length, in the longitudinal direction, of 1 m. That is to say, the spine and the housing each have a length of 992 mm, such that the entire pressure monitor has a length of 1 m when the end-plates are fitted to the ends of the housing. Each pressure sensor has a length of 990 mm.

The pressure switches further have a width of 14.35 mm and a height of 6.90 mm.

The pressure monitor has a depth (in the vertical direction when fitted to a bottom edge of a door), from the underside of the housing to a top edge of the upturned edges, of 44 mm. And the pressure monitor has a outer width (in the horizontal direction when fitted to a door) of 48 mm; and an inner width (as measured from an inner surface of each upturned edge) of 45 mm. Thus, the pressure monitor having these dimensions is for attachment to a door leaf having a bottom edge that is 1 m long, and having a thickness of 45 mm.

<Alert System>

Figure 3:
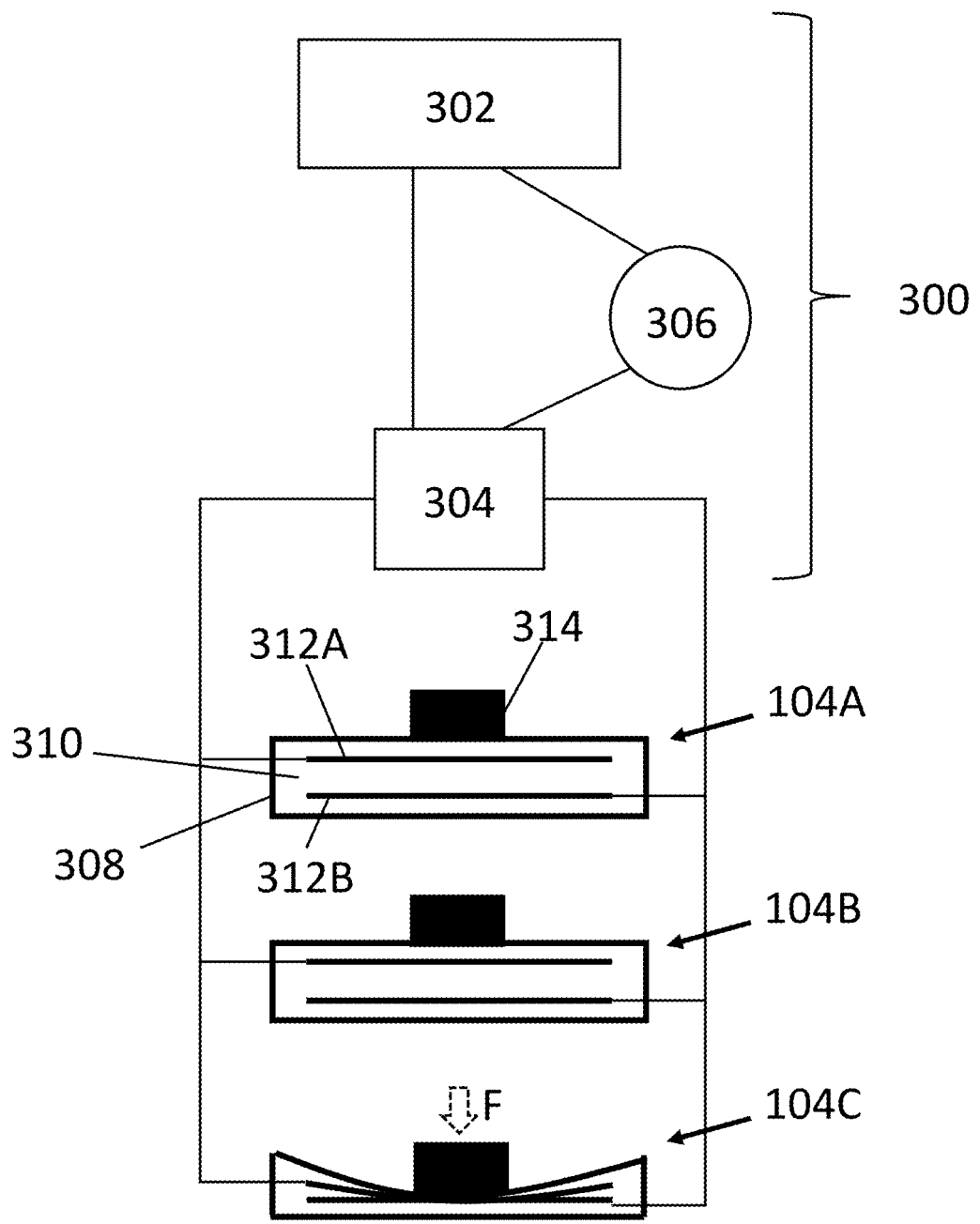
FIG. 3 is a schematic illustration of an alarm system as used in the pressure monitor of FIG. 1.

FIG. 3 is a schematic illustration of an alert system 300 as used in the pressure monitor of FIGS. 1, 2 and 4. As shown, alert system 300 is connected to each of the ribbon switches 104A-104C. In particular, alarm system comprises a power source 302, connecting block 304, and alert interface 306. Alert system 300 is housed within the box portion 204 of the pressure monitor 100, although the alert interface of the alert system may be located outside of the box portion. Alert system may be configured to issue an audible alert, a visual alert, or may comprise a wireless transmission device configured to transmit an alert signal to a remote location.

As depicted, each ribbon switch comprises a casing 308 having a hollow cavity 310. Disposed at opposing sides of the hollow cavity are a first electrode 312A and a second electrode 312B.

In a normal (uncompressed) state, as is shown for ribbon switches 104A and 104B, an air gap exists between the first electrode 312A and the second electrode 312B. In this uncompressed state, the switches are 'open'—i.e. they do not allow current to flow.

However, when a force F is applied to protrusion 314, as is shown for ribbon switch 104C, the ribbon switch is compressed by the force F. When the force exceeds a threshold amount, it will cause the first and second electrodes 312A, 312B to make contact—thus closing the switch such that current can flow. When this happens, the circuit between the battery 302 and the alert interface 306 is completed via the connecting block 204. An alert is thereby issued by the alert interface 306 of the alert system 300. A magnitude of the force required to close any one of the ribbon switches can be selected as required. Typically, the force required to close any one of the ribbon switches may be selected as approximately 68N (i.e. a force that is roughly equivalent the gravitational pull on a mass of 7 kg).

Similarly, if more than one of the ribbon switches are closed, an alert will be issued. Only one of the ribbon switches is required to be closed for an alert to be issued.

<Mode of Operation>

Operation of the pressure sensor 100 of FIGS. 1-4 will now be described.

When fitted to a door frame (not shown), the bottom of edge of the door leaf 200 (to which the pressure monitor 100 is attached) will sit close to the floor. By carefully fitting the door leaf 200 to the door frame, it is possible to ensure that the separation between the underside of the pressure monitor 100 and the floor is very small. Nonetheless, a small amount of clearance between the door frame and the floor is necessary to ensure that the door leaf can move to open and close the door. The applicant has found that even the smallest amount of clearance between a door leaf and the floor can be enough for an individual to pass a cable under the door leaf to create a ligature.

It is for this reason that the pressure monitor is attached to the bottom edge of the door. In order to anchor a ligature around the bottom edge of the door leaf 200 in FIG. 3, a cable has to be looped around the underside of the pressure monitor 100. When a cable is looped around the underside of the pressure sensor in FIG. 3, and a tension is applied to the cable, the cable will in turn exert a force F on the housing 106 of the pressure monitor 100. Depending on how the cable is secured, it could exert a force in any number of directions. The force could be applied in a first horizontal direction F1 (towards the right in FIG. 4A) or in a second horizontal direction F2 that is opposite to the first horizontal direction (towards the left in FIG. 4A), or in a vertical direction F3 (upwards in FIG. 4A). Or the force could be applied in a combination of the first horizontal direction F1 and the vertical direction F3. Or the force could be applied in a combination of the second horizontal direction F2 and the vertical direction F3.

Whichever direction the force is applied in, it will cause a corresponding movement of the housing 106 relative to the spine 102. For example, if the force is applied in the first horizontal direction F1, it will cause movement of the housing to the right. Accordingly, the first inner surface 210A of the housing will move towards the first wall 208A of the box portion 204; which in turn will compress the first ribbon switch 104A against the inner surface 210A of the housing. Accordingly, the electrical resistance of the first ribbon switch 104A will change due to this compression (pressure). Once the magnitude of F1 reaches a threshold level, the change in resistance of the ribbon switch 104A will reach a predetermined threshold, thereby causing the alert system to issue the alert signal.

It is to be understood that the above description is intended to be illustrative, and not restrictive. Many other implementations will be apparent to those of skill in the art upon reading and understanding the above description. Although the present disclosure has been described with reference to a specific example implementation, it will be recognized that the disclosure is not limited to the implementations described, but can be practiced with modification and alteration insofar as such modification(s) and alteration (s) remain within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A pressure monitor for attachment at an edge of a door leaf, the pressure monitor comprising:
   an inward structure;
   an outward structure; and
   a plurality of pressure sensors disposed between the inward structure and the outward structure;
   wherein the pressure monitor is configured to issue a signal in response to a force applied to the outward structure of the pressure monitor that causes at least one of the plurality of pressure sensors to compress between the outward structure and the inward structure;
   wherein the plurality of pressure sensors comprises a first sensor configured and arranged to detect forces applied in at least a first direction, and a second pressure sensor configured and arranged to detect forces applied in at least a second direction, wherein the first direction is perpendicular to a plane defined by the door leaf and wherein the second direction differs from the first direction.

2. The pressure monitor of claim 1, wherein the second direction is parallel to the plane defined by the door leaf.

3. The pressure monitor of claim 1, wherein the second direction is opposite to the first direction.

4. The pressure monitor of claim 2, wherein the plurality of pressure sensors comprises a third pressure sensor configured and arranged to detect forces applied in at least a third direction, wherein the second direction is opposite to the first direction, and the third direction is parallel to the plane of the door leaf.

5. The pressure monitor of claim 1, wherein the inward structure comprises a spine configured to attach to the edge of the door leaf, the spine comprising at least one elongate wall, wherein a respective one of the plurality of pressure sensors is positioned against a respective one of the at least one elongate wall.

6. The pressure monitor of claim 5, wherein the outward structure comprises a housing that houses the plurality of pressure sensors.

7. The pressure monitor of claim 6, wherein the spine comprises:

a plate portion for attachment to the edge of the door leaf; and a box portion arranged alongside the plate portion, the box portion comprising the at least one elongate wall, wherein each of the plurality of pressure sensors is attached to the box portion.

8. The pressure monitor of claim 7, wherein the housing houses the box portion such that each of the plurality of pressure sensors bears against a respective inner surface of the housing, wherein the housing is moveable relative to the box portion at least in the first direction and the second direction.

9. The pressure monitor of claim 8, wherein the housing comprises a lip which projects inwards from an inner surface of the box portion, and wherein the lip engages a recess in the spine between the plate portion and the box portion.

10. The pressure monitor of claim 1, wherein each pressure sensor comprises an electrical pressure sensor.

11. The pressure monitor of claim 10, wherein each pressure sensor comprises an electrical pressure switch.

12. The pressure monitor of claim 1, wherein the pressure monitor comprises an alert system connected to each of the plurality of pressure sensors; the alert system configured to issue an alert signal responsive to the force exceeding a predetermined threshold.

13. The pressure monitor of claim 12, wherein the predetermined threshold is 50N.

14. The pressure monitor of claim 1, wherein the inward structure comprises a plate portion and an elongate portion arranged parallel to the plate portion, the plate portion configured to attach along at least a portion of the edge of the door leaf, and the elongate portion configured to receive the plurality of pressure sensors.

15. The pressure monitor of claim 5, wherein each of the plurality of pressure sensors extends along a longitudinal axis of the pressure monitor.

16. A pressure-indicating assembly comprising:
a door leaf having an edge; and
a pressure monitor comprising:
an elongate spine configured to attach to the edge of the door leaf,
a housing configured to attach to the elongate spine, and
a plurality of pressure sensors disposed between the elongate spine and the housing, the plurality of pressure sensors respectively defining at least a portion of a circuit configured to issue a signal in response to a force applied to the pressure monitor compressing at least one of the plurality of pressure sensors between the elongate spine and the housing;
wherein the plurality of pressure sensors comprises a first sensor configured and arranged to detect forces applied in at least a first direction, and a second pressure sensor configured and arranged to detect forces applied in at least a second direction, wherein the first direction is perpendicular to a plane defined by the door leaf and wherein the second direction differs from the first direction.

17. The pressure-indicating assembly of claim 16, wherein the pressure monitor extends along substantially an entirety of the edge of the door leaf.

18. The pressure-indicating assembly of claim 16, further comprising the door leaf pivotally attached to a door frame.

19. The pressure-indicating assembly of claim 18, wherein the edge of the door leaf is a bottom edge.

20. A door alarm, comprising:
a spine configured to attach to an edge of a door leaf;
a contacting structure configured to attach to the spine;
a plurality of pressure sensors disposed between the spine and the contacting structure; and
an alert system;
wherein the plurality of pressure sensors are respectively configured to issue a signal to the alert system in response to a force applied to the contacting structure that compresses at least a corresponding one of the plurality of pressure sensors between the spine and the contacting structure; and
wherein the alert system is configured to issue an alert in response to the signal; and
wherein the plurality of pressure sensors comprises a first sensor configured and arranged to detect forces applied in at least a first direction, and a second pressure sensor configured and arranged to detect forces applied in at least a second direction, wherein the first direction is perpendicular to a plane defined by the door leaf and wherein the second direction differs from the first direction.

* * * * *